United States Patent
Mignano

(10) Patent No.: US 8,433,284 B1
(45) Date of Patent: Apr. 30, 2013

(54) LANDLINE-MOBILE SHARING DEVICE AND METHOD

(76) Inventor: Giancarlo Mignano, Miami, FL (US)

( * ) Notice: Subject to any disclaimer, the term of this patent is extended or adjusted under 35 U.S.C. 154(b) by 177 days.

(21) Appl. No.: 12/830,817

(22) Filed: Jul. 6, 2010

Related U.S. Application Data

(60) Provisional application No. 61/315,985, filed on Mar. 22, 2010.

(51) Int. Cl.
*H04M 11/00* (2006.01)

(52) U.S. Cl.
USPC .................. 455/406; 455/445; 455/414.1

(58) Field of Classification Search .......... 455/406, 455/445, 414.1
See application file for complete search history.

(56) References Cited

U.S. PATENT DOCUMENTS

| | | | |
|---|---|---|---|
| 6,493,438 B1 * | 12/2002 | Gross et al. | 379/114.22 |
| 2004/0136513 A1 * | 7/2004 | Chiu | 379/100.08 |
| 2007/0253545 A1 * | 11/2007 | Chatterjee et al. | 379/211.02 |
| 2007/0286412 A1 * | 12/2007 | Lennon et al. | 379/447 |
| 2008/0253543 A1 * | 10/2008 | Aharon | 379/201.12 |
| 2011/0047581 A1 * | 2/2011 | Caspi et al. | 725/80 |
| 2011/0069825 A1 * | 3/2011 | Rogson | 379/142.06 |
| 2011/0312300 A1 * | 12/2011 | Silver et al. | 455/410 |

* cited by examiner

*Primary Examiner* — Barry Taylor
(74) *Attorney, Agent, or Firm* — Ariel S. Bentolila; Bay Area IP Group, LLC

(57) ABSTRACT

A call processing system and respective method receives inbound calls having a first reference identification, generates a forwarding call to a subsequent, preprogrammed device using a second reference identification, and connects the inbound call with the forwarding call. The forwarding call connects the call processing system with the end user's cellular telephone. The end user establishes a service agreement with their service provider, wherein all calls between the subscriber's cellular telephone and the reference identification associated with the call processing system are considered as unaccountable or free airtime. The call processing system can offer the inbound caller options, including accessing a dial tone, call forwarding, continuing the dialed call, or terminating the call. The call processing system can include a series of telephony connections, Ethernet connections, Universal Serial Bus connections, etc. The call processing system can include common router and network switching capabilities for added versatility.

10 Claims, 3 Drawing Sheets

LANDLINE-MOBILE SHARING DEVICE AND METHOD

RELATED U.S. PATENT APPLICATION

This Non-Provisional US Application claims priority to Provisional U.S. Application 61/315,985, filed Mar. 22, 2010, which is incorporated in its entirety by reference herein.

FIELD OF THE INVENTION

The present disclosure generally relates to an apparatus and method for intermediately connecting a landline telephone call to a cellular telephone. More particularly, the present disclosure relates to a an apparatus that receives an inbound telephone call made to a landline and conferences the inbound call into an automated call forwarding to a cellular telephone.

BACKGROUND OF THE INVENTION

People always continue to pursue lower cost options for living expenses or operating costs. One focus is directed towards utility costs. These include power, water, and communications. Landline telephone services are offered charging fixed local calling rates and either fixed or toll-based long distance calling rates. The toll-based rates are based upon minutes (or partial minutes) of talk time, with additional considerations for international calls. Cellular telephone services are offered charging airtime based rates with considerations for specific call connections. The monthly service charge includes an allotment of airtime. Any overage is charged per minute (or partial minute) at a substantially higher rate. Any underutilization of the allotment is either applied to the customer's subsequent bill or simply lost. The customer needs to determine an optimal monthly utilization and base a contract on an allotment of airtime accordingly.

Cellular telephone service providers have offered unallocated airtime for specific connections. One exemplary credited airtime would include calls made between two cellular telephones associated with the same service provider. A second exemplary credited airtime would include calls between a previously established series of specific telephone numbers and the subscriber's cellular telephone. A third exemplary credited airtime would include calls between a landline having service provided by the subscriber's cellular telephone service provider and the subscriber's cellular telephone.

A caller is desirous of contacting an individual. The caller dials a telephone number to contact the individual. If the individual is not available at that telephone number, it is common for an answering system to record a message from the calling party. The caller can subsequently try another telephone number to try to attempt to contact the desired individual. This requires that the recipient disseminate their cellular telephone number. There are many reasons why this would be undesirable.

A recipient can opt to forward calls from a telephone number to their cellular telephone. This process redirects the inbound call to a new telephone number. The cellular subscriber would incur airtime charges in accordance with the calling parties telephone number.

Therefore, it would be desirable to have a device that increases the connectivity between an inbound call and the desired recipient, while reducing the monthly expenses respective to cellular telephone service.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
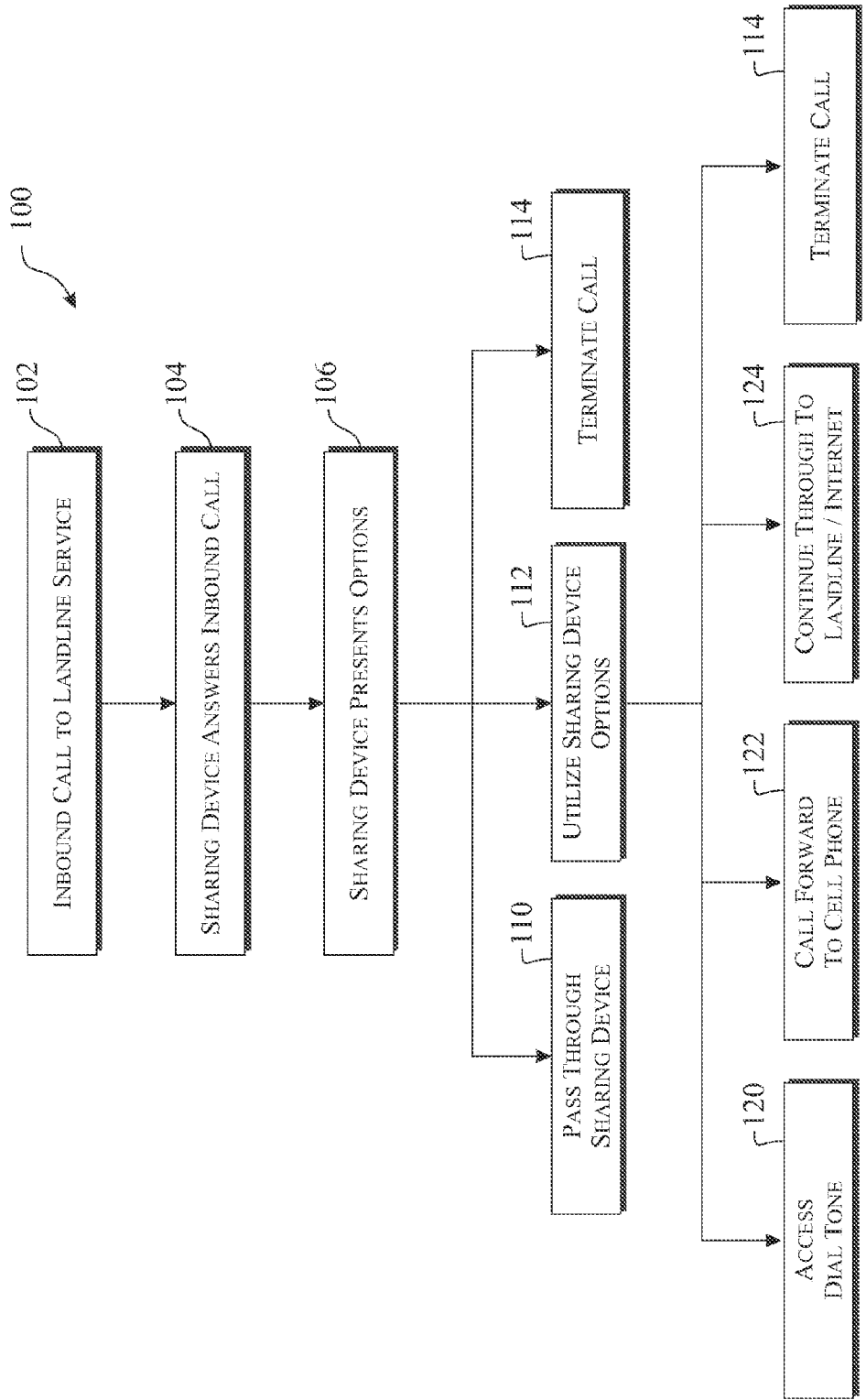
FIG. 1 presents an exemplary call processing flow diagram.
Figure 2:
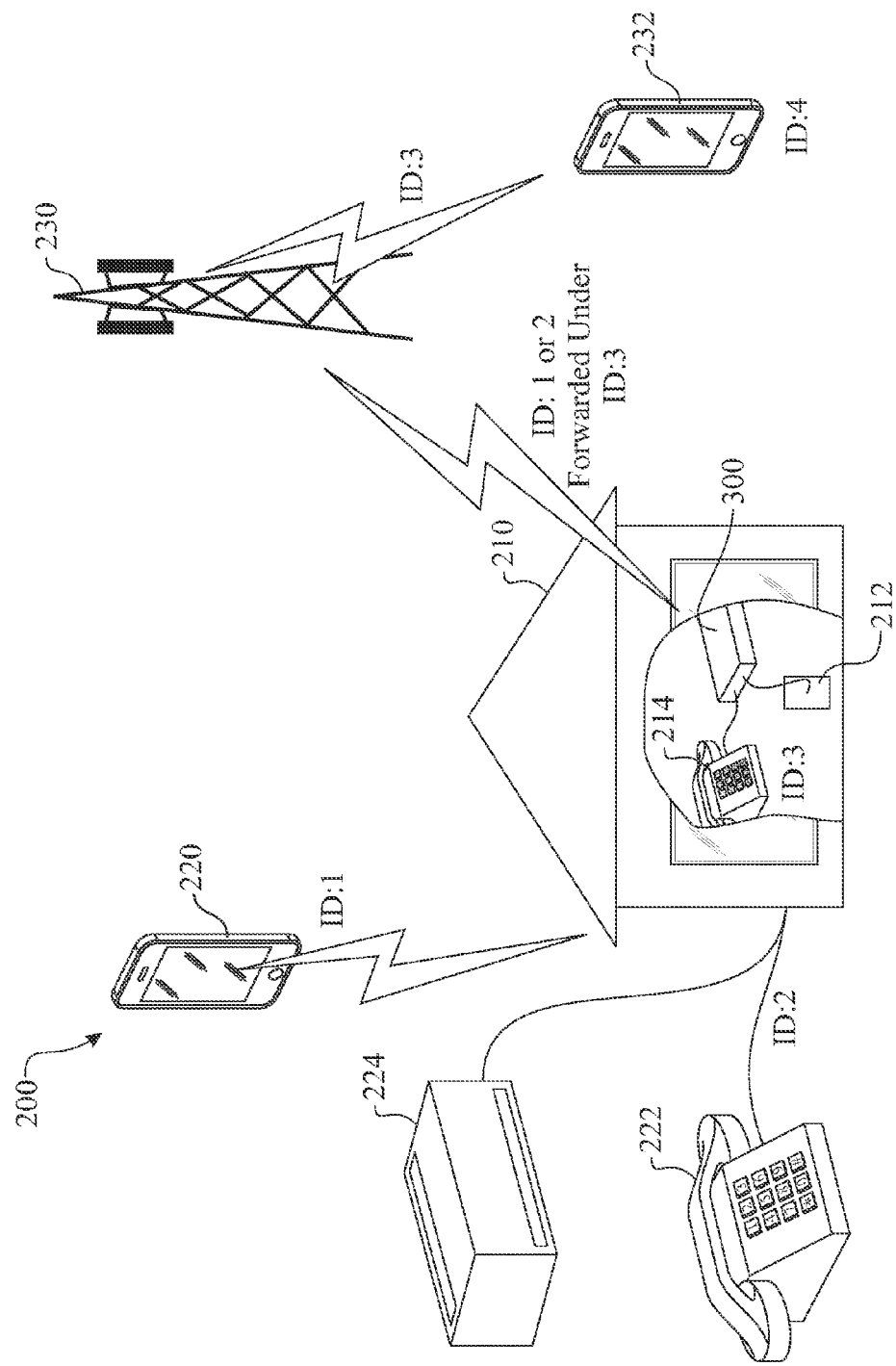
FIG. 2 presents an exemplary call processing block diagram.

An exemplary call processing method 100 is presented in FIG. 1, with a supporting exemplary call processing system 200 block diagram being shown in FIG. 2. The call processing method 100 initiates with an inbound call to a landline service 102. The inbound call can be initiated from an inbound cellular telephone 220, an inbound landline telephone 222, an inbound fax machine 224, and the like. It is understood that as technology advances other inbound call technology would be considered as inclusive. The inbound call is forwarded to a structure 210. The signal is distributed to each of the recipient wall outlets 212 networked throughout the structure 210. A call processing device 300 is connected to one of the recipient wall outlets 212. The recipient wall outlets 212 are representative and can be considered as the telephony lines, a modem line (such as a cable modem, DSL, T-1, and the like), or any other communications interface. This would accommodate the use of telephony, Voice Over Internet Protocol (VOIP), and any other communications protocol. The inbound call is received by the call processing device 300 in accordance with an inbound call answering step 104. The call processing device 300 can then optionally offer the inbound caller options 106. The options can include passing through the processing device 110, utilizing call processing device options 112, or terminate the call 114. Should the user elect to pass through the processing device 110, the call would be continued to a structure recipient landline telephone 214, an answering device, a fax machine, and the like. The call processing device 300 would listen in on the inbound call to determine if the inbound call is transmitting a fax tone, a Dual-tone multi-frequency signaling (DTMF) (commonly referred to as a touch tone signal), a voice transmission, and the like. The call processing device 300 would interpret the identified signals and respond accordingly. Should the call processing device 300 fail to detect an inbound signal, the call processing device 300 would terminate the inbound call 114 and reset into an on-hook condition.

The call processing device options 112 offer the inbound caller several options, including accessing a dial tone 120, forwarding the inbound call to the recipient's cellular telephone 122, continuing the connection through the landline or Internet 124, or terminating the call 114. The call processing device 300 offers the inbound caller the ability to access a dial tone 120, allowing the inbound caller to dial a new number. The system could include programmable limitations, such as no long-distance dialing, no international dialing, and the like. The user would establish the criteria based upon the long-distance and international calling portions of their landline service agreement. This establishes limitations and controls imposed upon the inbound calling party. Should the inbound caller elect the option of forwarding the inbound call to the recipient's cellular telephone 122, the call processing device 300 would dial a phone number to connect a call to a recipient's cellular telephone 232. The inbound caller can elect to continue through the landline or Internet 124. This option connects the inbound call with a recorder, voice mail, or similar associated with the respective telephone line of the structure 210. This option could also be utilized to connect a fax machine, a modem, and the like. The inbound caller can manually request to terminate the call 114 or simply hang up. The call processing device 300 monitors the circuit to determine if one of the connections has disconnected. Upon identification of the disconnection, the call processing device 300 terminates the call. Intelligence can be included to disconnect only a portion of the connections.

The step of forwarding the inbound call to the recipient's cellular telephone 122 can be activated or deactivated by the user. The user can change the status of activation of the forwarding process by contacting a switch on the call processing device 300, remotely accessing the call processing device 300 and entering a specific code, a command provided via an Internet webpage, a remote command transmitted via an email, a short message service (SMS) transmission, and the like. A preprogrammed window of time can be used as an alternate or secondary means of controlling the activation of the forwarding the inbound call to the recipient's cellular telephone 122.

When forwarding the inbound call to the recipient's cellular telephone 122, the inbound reference identifier used to identify and log the calling party is masked, as the connecting call utilizes the reference identifier of the call processing device 300. The outbound call can be provided across a landline telephone network associated with the structure or a cellular telephone modem associated with the structure. In a first example, the reference identifier of the inbound cellular telephone 220 (ID: 1) is received by the call processing device 300. The call processing device 300 in turn calls the recipient's cellular telephone 232 via a new connection using the reference identifier of the call processing device 300 (ID:3). The call processing device 300 automatically connects to the recipient's cellular telephone 232 via a recipient cellular network 230. The reference identifier for the call is ID:3, thus utilizing the airtime billing associated with reference identifier ID:3. The recipient (cellular subscriber) would configure their contract agreement with the cellular provider whereby airtime associated with all calls between the recipient's cellular telephone 232 and the call processing device 300 is free. At a point during the call, the call processing device 300 automatically conferences the inbound call from the inbound cellular telephone 220 to the connection substantiated between the call processing device 300 and the recipient's cellular telephone 232. Conversely to forwarding the call that would utilize reference identifier ID:1 with the call data record (CDR), the call processing device 300 generates call utilizing reference identifier ID:3 to call back a device associated with the inbound call by dialing the inbound call reference ID. Similarly the call processing device 300 would mask the reference identifier ID:2 of an inbound call from the inbound landline telephone 222 by conferencing the inbound call with a connection between the call processing device 300 and the recipient's cellular telephone 232 using reference identifier ID:3. This system allows the subscriber to receive and forward unlimited calls inbound to a specific number, and utilizes a single reference identifier for connecting the calls to the recipient's cellular telephone 232.

Figure 3:
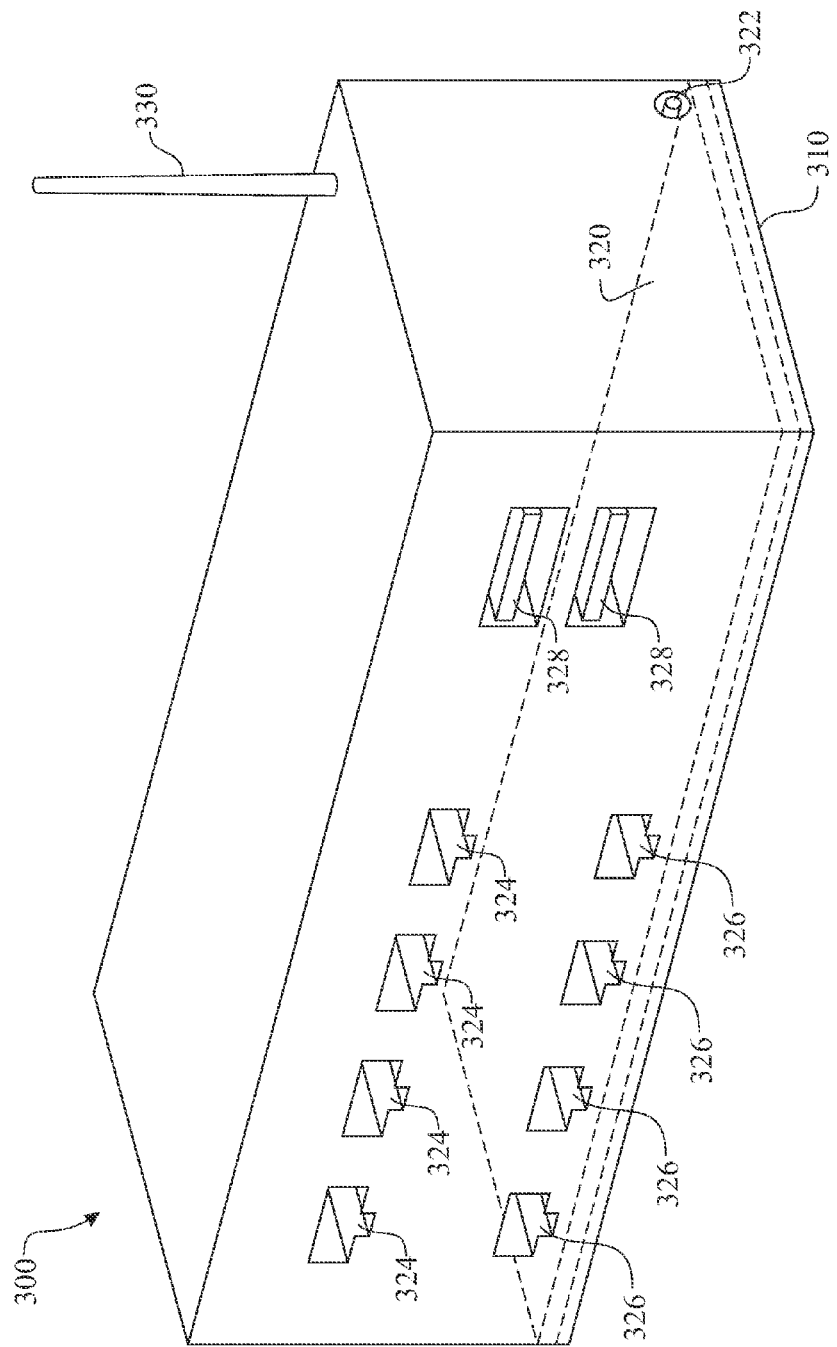
FIG. 3 presents an exemplary call processing device.

An exemplary embodiment of the call processing device 300 is detailed in FIG. 3. The call processing device 300 is fabricated having a call processing device housing 310. A printed circuit assembly 320 provides electrical circuitry (including a microprocessor and respective operational firmware), power regulation circuitry, signal connectors and system integration. A power support connector 322 is provided to receive power from an external power source. The power support connector 322 is one exemplary means for providing power to the printed circuit assembly 320. Power can alternately be provided by a portable power source such as batteries; a green energy source such as solar power, a network power source such as a solar panel; and the like. The circuitry can include connections and respective drivers for any of a variety of interfaces, including at least one RJ 45 Ethernet connection 324, at least one RJ 11 telephone connection 326, and/or at least one Universal Serial Bus (USB) connection 328. The printed circuit assembly 320 can include circuitry, respective software, and antennas 330 providing a wireless connection, such as a radio frequency (RF) connection, a cellular modem interface, a WiFi connection, ZigBee connection, and the like. The RJ 45 Ethernet connection 324 provides an interface for connectivity to a local wired network and other networked devices. A series of RJ 45 Ethernet connections 324 can be utilized as a network switch between devices. The devices can include a computer, a fax machine, a printer, a scanner, a Voice Over Internet Protocol (VOIP) telephone, a video phone, and the like. Alternately, a wireless connection can be provided to replace the wired connections. A series of RJ11 telephone connections 326 can be integrated providing connectivity between the call processing device 300 and a series of standard telephony devices, including telephones, answering machines, modems, fax machines, and the like. A series of RJ11 telephone connections 326 can be integrated providing connectivity between the call processing device 300 and a series of electronic devices. The RJ11 telephone connection 326 has become a common standard interface for communicating between electronic devices. It is understood that other interfaces can be integrated into the call processing device 300 as technology advances, and the terms would be inclusive of new technologies having equivalent functions as those disclosed herein.

The printed circuit assembly 320 includes software to monitor the status of each call connection. When the printed circuit assembly 320 determines a call connection is no longer valid, the printed circuit assembly 320 reverts to an on-hook status. When an incoming call is determined to remain connected to the network provided within the 210, the call processing device 300 redirects the call into the network and maintains the respective status until another device engages with the call. Upon engagement, the printed circuit assembly 320 terminates the connection to the call processing device 300, leaving the connection between the other device and the call in tact.

The system can alternately forward calls to a specific extension within a VOIP network. The VOIP network can accommodate nodes or extensions at remote locations via the Internet. The call processing device 300 would forward calls to the specific node.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A phone call processing method, comprising the steps of integrating a phone call processing device into a telephone network deployed within only a single structure at only one fixed location, the structure telephone network having an associated structure network reference ID, the phone call processing device comprising:
a housing;
a call processing circuit;
a power input in electrical communication with the call processing circuit, and
at least one communications connection in signal communication with the call processing circuit;
receiving an inbound call, the inbound call having an associated inbound call reference ID;
automatically calling a predetermined cellular telephone utilizing the structure network reference ID, the predetermined cellular telephone being the only cellular telephone associated with the automatic calling, an airtime for the call to the predetermined cellular telephone is associated with the structure network reference ID, to be recognized by a cellular provider of a subscriber of the predetermined cellular telephone, without the subscriber of the predetermined cellular telephone and a subscriber of the structure telephone network receiving a billing for the call;
creating a signal connection between the phone call processing device and the predetermined cellular telephone;
conferencing the inbound call with the call to the predetermined cellular telephone; and
disconnecting all of the connections when the call is terminated.

2. The phone call processing method as recited in claim 1, the method further comprising the step of:
conveying an option to a party making the inbound call to override the step of automatically calling the predetermined cellular telephone and continue with a connection to the structure's telephone network.

3. The phone call processing method as recited in claim 1, the method further comprising the steps of:
monitoring a signal from an inbound call;
determining if the inbound call is a fax machine;
overriding the step of automatically calling the predetermined cellular telephone and continuing with a connection to the structure's telephone network; and
receiving an incoming fax.

4. The phone call processing method as recited in claim 1, wherein the step of creating a signal connection between the phone call processing device and the predetermined cellular telephone is completed by the phone call processing device calling back a device associated with the inbound call by dialing the inbound call reference ID.

5. The phone call processing method as recited in claim 1, wherein the step of creating a signal connection between the phone call processing device and the predetermined cellular telephone is completed using a cellular modem integrated into the call processing device.

6. A phone call processing method comprising the steps of:
integrating a phone call processing device in to a telephone network deployed within only a single structure at only one fixed location, the structure telephone network having an associated structure network reference ID, the phone call processing device comprising:
a housing;
a call processing circuit;
a power input in electrical communication with the call processing circuit; and
at least one communications connection in signal communication with the call processing circuit;
receiving an inbound call, the inbound call having an associated inbound call reference ID;
conveying options to a calling party associated with the inbound call to select one of continue the call to the dialed number, automatically forward the inbound call to a predetermined cellular telephone utilizing the structure network reference ID, the predetermined cellular telephone being the only cellular telephone associated with the automatic forward, an airtime for the call to the predetermined cellular telephone is associated with the structure network reference ID, to be recognized by a cellular provider of a subscriber of the predetermined cellular telephone, the predetermined cellular telephone being the only cellular telephone associated with the automatic calling, without the subscriber of the predetermined cellular telephone and a subscriber of the structure telephone network receiving a billing for the call;
selecting the option to automatically forward the inbound call to the predetermined cellular telephone utilizing the structure network reference ID, the predetermined cellular telephone being the only cellular telephone associated with the automatic forward, an airtime for the call to the predetermined cellular telephone is associated with the structure network reference ID, to be recognized by a cellular provider of a subscriber of the predetermined cellular telephone, without the subscriber of the predetermined cellular telephone and a subscriber of the structure telephone network receiving a billing for the call;
creating a signal connection between the phone call processing device and the predetermined cellular telephone, the step of creating a signal connection between the phone call processing device and the predetermined cellular telephone is completed using a cellular modem integrated into the call processing device and the step of conveying options to the calling party method further comprises an option of accessing a dial tone;
conferencing the inbound call with the call to the predetermined cellular telephone; and disconnecting all of the connections when the call is terminated; and
terminate the call.

7. The phone call processing method as recited in claim 6, wherein the step of creating a signal connection between the phone call processing device and the predetermined cellular telephone is completed by the phone call processing device calling back a device associated with the inbound call by dialing the inbound call reference ID.

8. The phone call processing method as recited in claim 6, wherein the step of creating a signal connection between the phone call processing device and the predetermined cellular telephone is completed using a cellular modem integrated into the call processing device.

9. The phone call processing method as recited in claim 6, wherein the step of creating a signal connection between the phone call processing device and the predetermined cellular telephone is completed using a cellular modem integrated into the call processing device.

10. A phone call processing method consisting of the steps of:
   integrating a phone call processing device into a telephone network deployed within only a single structure at only one fixed location, the structure telephone network having an associated structure network reference ID, the phone call processing device comprising:
      a housing;
      a call processing circuit, a cellular modem;
      a power input in electrical communication with the call processing circuit; and
      at least one communications connection in signal communication with the call processing circuit;
   receiving an inbound call, the inbound call having an associated inbound call reference ID;
   monitoring a signal from the inbound call;
   determining if the inbound call is a fax machine, upon the determination, continuing with a connection to the structure's telephone network, and receiving an incoming fax;
   conveying options to a calling party associated with the inbound call to select one of continue the call to the dialed number, access a dial tone, automatically forward or conference the inbound call to a predetermined cellular telephone utilizing the structure network reference ID and the cellular modem, the predetermined cellular telephone being the only cellular telephone associated with the automatic forward or conference, an airtime for the call to the predetermined cellular telephone is associated with the structure network reference ID, to be recognized by a cellular provider of a subscriber of the predetermined cellular telephone, without the subscriber of the predetermined cellular telephone and a subscriber of the structure telephone network receiving a billing for the call; and
   terminate the call;
   receiving a response to the options wherein the response to the options is providing by at least one of: a touch tone entry, and a voice response;
   interpreting the response; and
   fulfilling the action directed by the selected option.

* * * * *